Nov. 3, 1970  D. W. HAWK  3,537,735

RELEASABLE JOINT HAVING TAPERED PARTS

Filed Sept. 2, 1969

Inventor
Dale W. Hawk
By Charles L. Schwab
Attorney

United States Patent Office 3,537,735
Patented Nov. 3, 1970

3,537,735
RELEASEABLE JOINT HAVING TAPERED PARTS
Dale W. Hawk, Springfield, Ill., assignor to Allis-Chalmers Manufacturing Company, Milwaukee, Wis.
Filed Sept. 2, 1969, Ser. No. 855,079
Int. Cl. B25g 3/28
U.S. Cl. 287—20.3
7 Claims

ABSTRACT OF THE DISCLOSURE

A pivot member for mounting a cylinder is secured to the frame of the vehicle by a tapered joint including a split tapered sleeve. To facilitate removal of both the tapered pivot member and tapered sleeve, a threaded fastening member for the pivot member is provided with a pair of axially spaced abutment surfaces which sequentially abut with the pivot member and sleeve as the fastening member is screwed out.

---

The invention relates to means for forceably releasing a pair of parts connected through a tapered joint including a tapered sleeve and more specifically relates to means for positively separating parts and sleeve on removal of the tension member which holds the parts and sleeve in assembly.

Heretofore, considerable difficulty has been encountered in separating a pair of tapered members rigidly secured together to form a rigid joint. The present invention is directed not only toward means for positively removing one tapered member from another but also to means for removing a tapered sleeve from its bore in the female part of the joint.

It is an object of the present invention to provide a convenient means for positively removing a tapered part and its mating sleeve from a supporting part.

It is a further object of the present invention to provide removal means as hereinbefore outlined wherein the tension member used to fasten the parts in assembly is used on release to forceably separate the parts.

These and other objects and advantages of this invention will be apparent to those familiar with the art when the following description is read in conjunction with the drawings in which.

Figure 1:
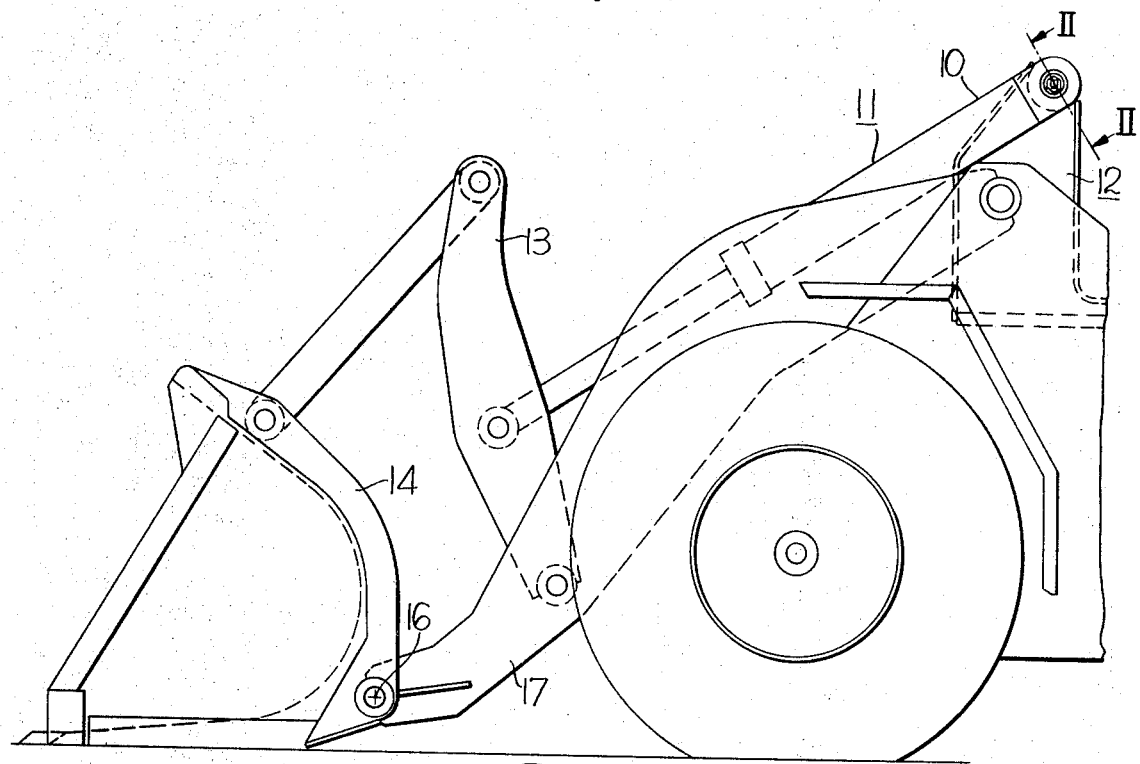
FIG. 1 is a partial side view of a tractor loader in which the present invention is employed.
Figure 2:
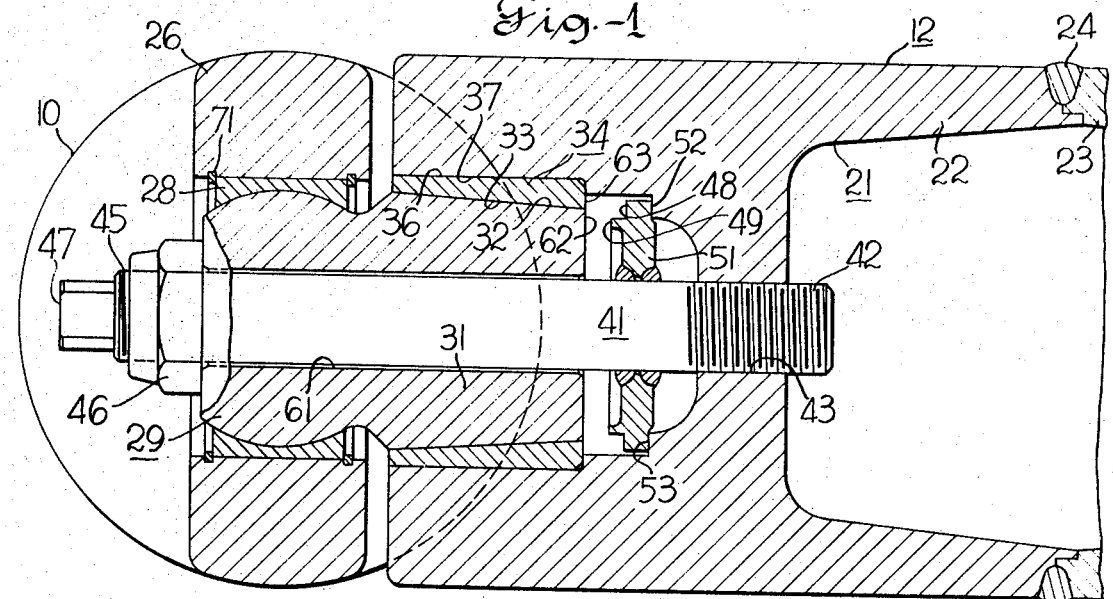
FIG. 2 is a section view along the lines II—II in FIG. 1.
Figure 3:
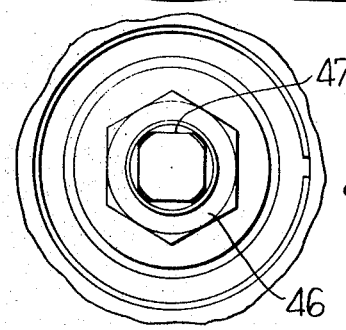
FIG. 3 is an end view of the fastening means for holding the parts of the pivot joint in assembly.

The present invention has been found particularly useful in connecting the cylinder 10 of a hydraulic jack 11 to the frame 12 of a tractor loader. A pair of jacks 11 operate the bucket tilting linkage 13 to pivot the bucket 14 about axis 16 of its pivot connection with the lifting boom 17. Referring also to FIG. 2, the frame 12 of the vehicle includes a transversely disposed support 21 which includes a pair of machined castings 22, 23 connected by weld 24. A flange part 26 on the rear end of the cylinder 10 of jack 11 is connected to the support part 21 through annular bearing members in the form of a socket part 28 and a ball pivot part 29 presenting cooperating spherical bearing surfaces. The ball pivot part 29 includes a tapered portion 31 presenting a radially outward facing conically tapered surface 32 which, as illustrated in FIG. 2, is in wedging engagement with radially inward facing conical surface 33 on a longitudinally split, one piece sleeve 34. The sleeve 34 has a radially outward facing cylindrical surface 36 in engagement with an inward facing cylindrical surface 37 defining a bore in support part 21. The ball pivot part 29 and sleeve 34 are rigidly connected to the support part 21 by fastening means including a tension member 41 having a threaded end 42 in threaded engagement with a drilled and tapped opening 43. The tension member 41 also has threads 45 on its other end on which nut 46 is threaded and has an extreme end portion 47 which is squared off to permit cooperative engagement with a suitable wrench. This squared-off condition of portion 47 is more clearly ascertained by reference to FIG. 3. The tension member 41 includes annular flange 51 presenting a pair of axially facing abutment surfaces 48, 49 which are in axially confronting relation to end surfaces of sleeve 34 and pivot part 29. The flange 51 on which surfaces 48, 49 are formed also includes an axially facing surface 52 which, in the assembled condition of the parts as illustrated in FIG. 2, is in axial thrust transmitting engagement with a shoulder 53 on support part 21.

During assembly of the parts, the fastening member 41 is threaded into opening 43 until surface 52 firmly abuts shoulder 53. Then the sleeve 34 and pivot part 29 are inserted into the opening defined by the bore 37 and the nut 46 is threaded onto threads 45 of the fastening member 41 until the mating tapered surfaces 32, 33 are in firm wedging engagement.

When it is desired to disassemble the sleeve 34 and pivot part 29 from the support part 21, the nut 46 is loosened and then the pivot member 41 is turned with a wrench engaging the squared end 47 so that the tension member 41 moves axially to the left as viewed in FIG. 2. Since the member 41 has clearance in the bore 61 of pivot part 29, the pivot part 29 will not move out of its wedged engagement with the sleeve 34 until the abutment surface 49 engages the flat end surface 62 of pivot part 29. Further unscrewing after such engagement will remove the pivot part 29 and if the sleeve does not move axially with the pivot part, it will be engaged by surface 48 against its flat end surface 63. As the tension member 41 is further unscrewed from threaded opening 43, the sleeve 34 will be forceably removed from bore 37 along with pivot part 29. Thus, it is seen that by unscrewing tension member 41, it is possible to first axially move pivot part 29 and upon further unscrewing to also move split sleeve 34 from bore 37. If it is desired to remove the pivot part 29 without removing sleeve 34, this can be accomplished by removing nut 46 and slipping the pivot part 29 off the tension member 41. This can be done without removing the jack 11 by removing snap ring 71 which will allow socket part 28 to be removed to the left with ball pivot part 29.

The embodiments of the invention in which an exclusive property or privilege is claimed are defined as follows:

1. In a releasable joint:
   a first part having a radially outward facing tapered portion and an inner end,
   a second part having a cylindrical surface defining a bore and receiving said first part therein,
   a split sleeve having:
      an inner end adjacent the said inner end of said first part,
      a radially inward facing tapered surface engaging said tapered portion of said first part, and
      a radially outward facing cylindrical face in engagement with said cylindrical surface of said second part, and
   fastening means extending through and interconnecting said parts including a tension member having:
      a threaded portion at one end in threaded engagement with said second part,
      a first abutment surface spaced from said one end in axially confronting relation to the said inner end of said first part for engagement therewith, and a second abutment surface in axially confronting relation to said sleeve.

2. The invention of claim 1 wherein said outward facing tapered portion and said tapered surface are conically formed.

3. The invention of claim 2 wherein said tension member includes threads spaced axially of said threaded portion and said fastening means includes a nut in cooperative engagement with said threads and in axial thrust transmitting engagement with said first part.

4. The invention of claim 3 wherein said tension member includes an annular flange between said threads and said threaded portion and wherein said first and second abutment surfaces are formed on said flange, 5. The invention of claim 4 wherein said first part includes an annular bearing surface adapted for pivotal engagement with another part.

6. The invention of claim 5 wherein said bearing surface is disposed between said tapered portion and said nut.

7. The invention of claim 6 wherein said flange is in axial engagement with said second part in the assembled condition of said joint.

References Cited

UNITED STATES PATENTS

| | | | |
|---|---|---|---|
| 1,880,375 | 10/1932 | Davis | 85—74 |
| 2,430,524 | 11/1947 | Miller. | |
| 3,114,528 | 12/1963 | Forest | 85—74 |
| 3,348,888 | 10/1967 | Hawk. | |

KENNETH DOWNEY, Primary Examiner

A. V. KUNDRAT, Assistant Examiner

U.S. Cl. X.R.

287—52.06